March 19, 1940. C. E. STIEHL Re. 21,405

POWER SHOVEL

Original Filed Sept. 18, 1937 3 Sheets-Sheet 1

Carl E. Stiehl,

INVENTOR.

BY Hoar, Ruhloff & Arnaud

ATTORNEYS

March 19, 1940. C. E. STIEHL Re. 21,405

POWER SHOVEL

Original Filed Sept. 18, 1937 3 Sheets-Sheet

Carl E. Stiehl,
INVENTOR.

BY Hoar, Ruhloff & Armand

ATTORNEYS.

March 19, 1940. C. E. STIEHL Re. 21,405

POWER SHOVEL

Original Filed Sept. 18, 1937 3 Sheets-Sheet 3

Carl E. Stiehl,

INVENTOR.

BY Hoar, Ruhloff & Arnaud

ATTORNEYS.

Reissued Mar. 19, 1940

Re. 21,405

UNITED STATES PATENT OFFICE 21,405

POWER SHOVEL

Carl E. Stiehl, South Milwaukee, Wis., assignor to Bucyrus-Erie Company, South Milwaukee, Wis., a corporation of Delaware Original No. 2,140,460 dated December 13, 1938, Serial No. 164,454, September 18, 1937. Application for reissue November 3, 1939, Serial No. 302,727

8 Claims. (Cl. 214—135)

My invention relates to new and useful improvements in power shovels, and more particularly power shovels of the type having a boom and an outward digging dipper mounted on the end of a handle, which handle is reciprocable with respect to a point on the boom known as the shipper shaft, the dipper being movable in a circular arc about this point as a center.

The saddle block is that portion of the assembly which holds the dipper handle to the shipper shaft, and through which the dipper handle reciprocates.

The dipper in digging encounters two sorts of stresses which have thus far presented almost insuperable problems in shovel design. The first of these is an uneven downward pressure of the bank upon the two front corners of the dipper. The second of these is a sideward push upon the dipper; this latter occurs not only during digging, but also during acceleration and deceleration of the swinging cycle; this sideward push will be referred to as "side-thrust."

If the handle be built narrow, to pass through a divided boom, a side thrust on the dipper is apt to tear the boom apart. If, on the other hand, the handle be built in two parts, straddling the boom, its side thrusts and twists would impart a twist to the boom. To meet these objections, various expedients have been adopted in the past, such as building the boom with a spring foot, and/or widely supporting the boom at its outer point and at the shipper shaft, either with or without some interlock between these two support means. But none of these expedients has been wholly satisfactory.

Accordingly it is the principal object of my present invention to provide a novel form of construction of the front and equipment of a power shovel, so that the digging strains will be transmitted to those parts of the machine best able to stand them, and be resisted at such points.

A further object of my present invention is to provide a dipper handle and a resilient saddle block mounting therefor, so contrived and designed as to form one of the elements of my main combination.

In addition to this principal object, I have worked out a number of novel and useful details, which will become readily evident as the description progresses.

My invention is designed to combine all of the advantages with none of the disadvantages of the expedients of the prior art.

To accomplish this end, I combine four features, namely: (1) a freely swivelable dipper-handle; (2) a sidewardly resilient saddle-block, within which the handle swivels and reciprocates; (3) rope thrusting means; and (4) the twin hoist ropes.

These four features cooperate as follows. The swiveling of the dipper-handle and the resilience of the saddle block relieve the boom of twisting strains at the shipper-shaft. The resilience of the saddle-block, moreover, tends to restore the handle to the plane of the boom. The rope thrust eliminates uneven presentation of the handle to its crowding means, which uneven presentation would otherwise largely offset the advantages gained by the just-mentioned flexibility. And the twin hoist-ropes serve to steady the handle against twisting, and yet do not impart any twisting strain to the boom.

A fairly satisfactory subcombination would consist in items 1, 3 and 4, with item 2 as a very desirable addition.

Another fairly satisfactory sub-combination would consist in items 1, 2 and 4, with item 3 as a very desirable addition.

Also I wish to claim specifically the details of item 2.

My invention consists in the novel parts, and in the combinations and arrangements thereof, which are defined in the appended claims, and of which one embodiment is exemplified in the accompanying drawings, which are hereinafter particularly described and explained.

Throughout the description, the same reference number is applied to the same member or to similar members.

Figure 3:
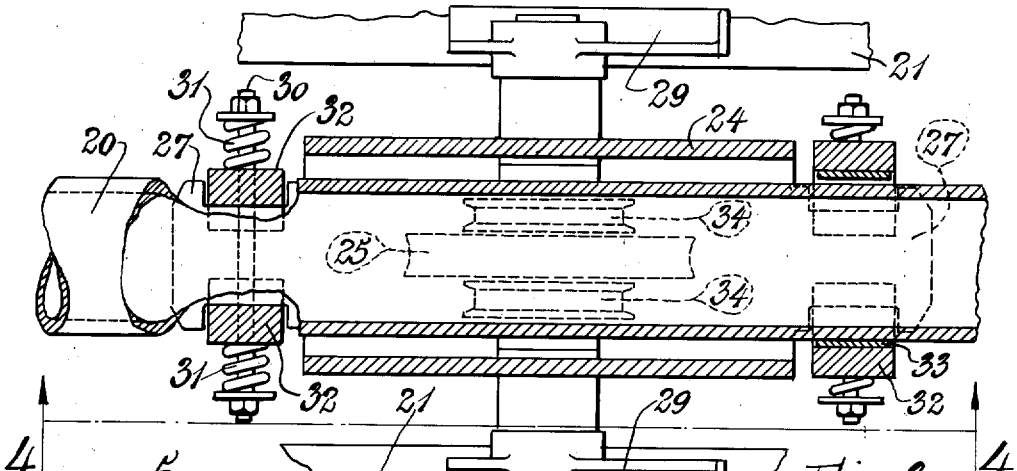
Figure 3 is a plan view, partly in section, of the saddle block and part of the boom and handle of Figures 1 and 2, taken along the line 3—3 of Figure 4.
Figure 6:
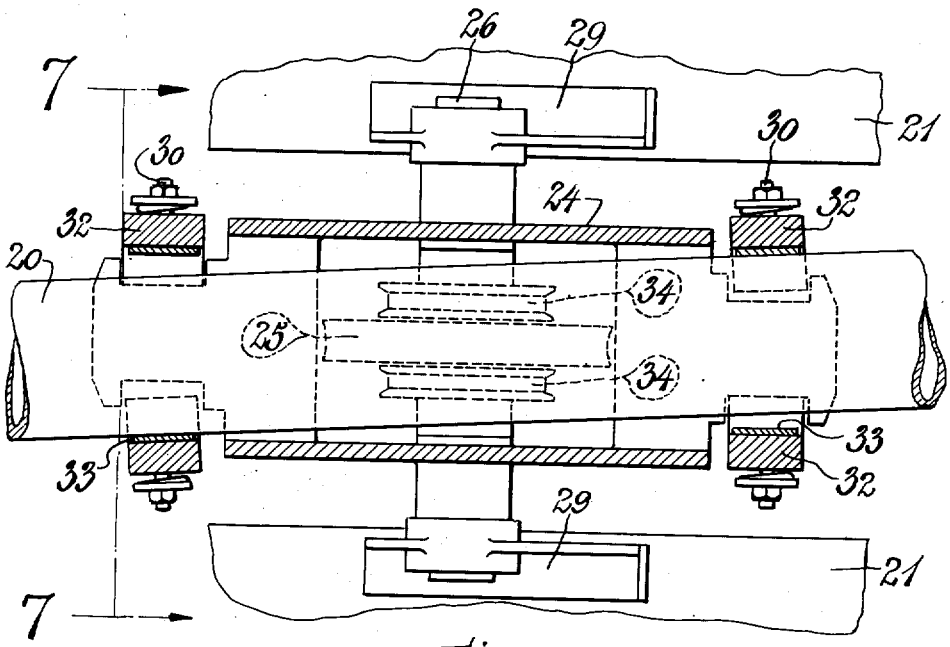

Figure 6 corresponds somewhat to Figure 3, except that the handle is not in section in Figure 6. It is taken along the lines 6—6 of Figure 7, and shows the parts during side thrust.

Figure 4:
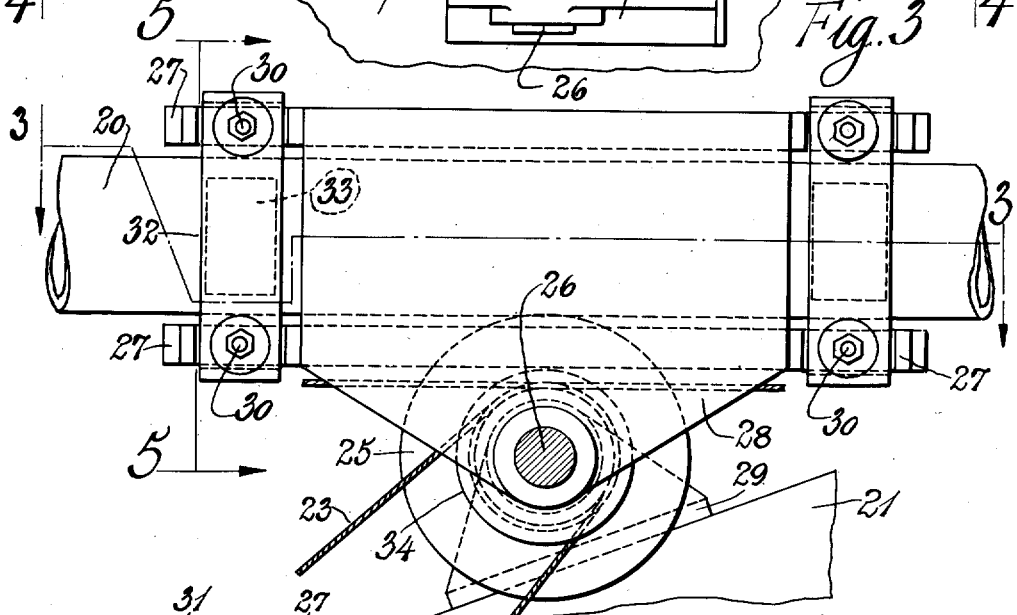
Figure 4 is a side elevation of these parts, taken along the line 4—4 of Figure 3.
Figure 7:
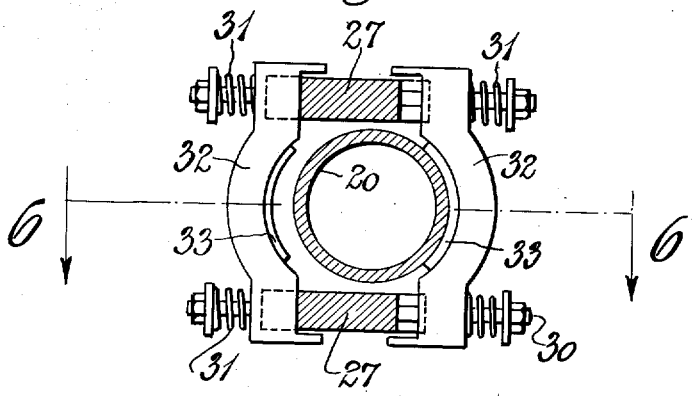

Figure 7 corresponds to Figure 4. It is taken along the line 7—7 of Figure 6, and shows the parts during side thrust.

Figure 2:
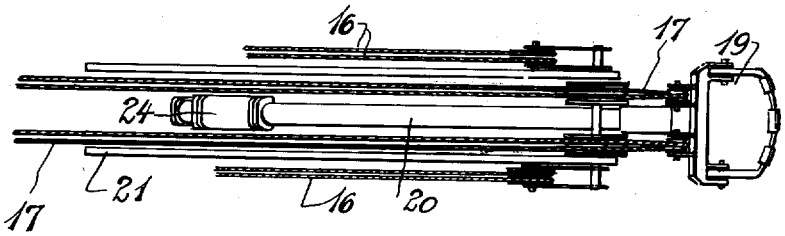
Figure 2 is a plan view of the boom, handle and ropes of my invention, taken along the line 2—2 of Figure 1.
Figure 1:
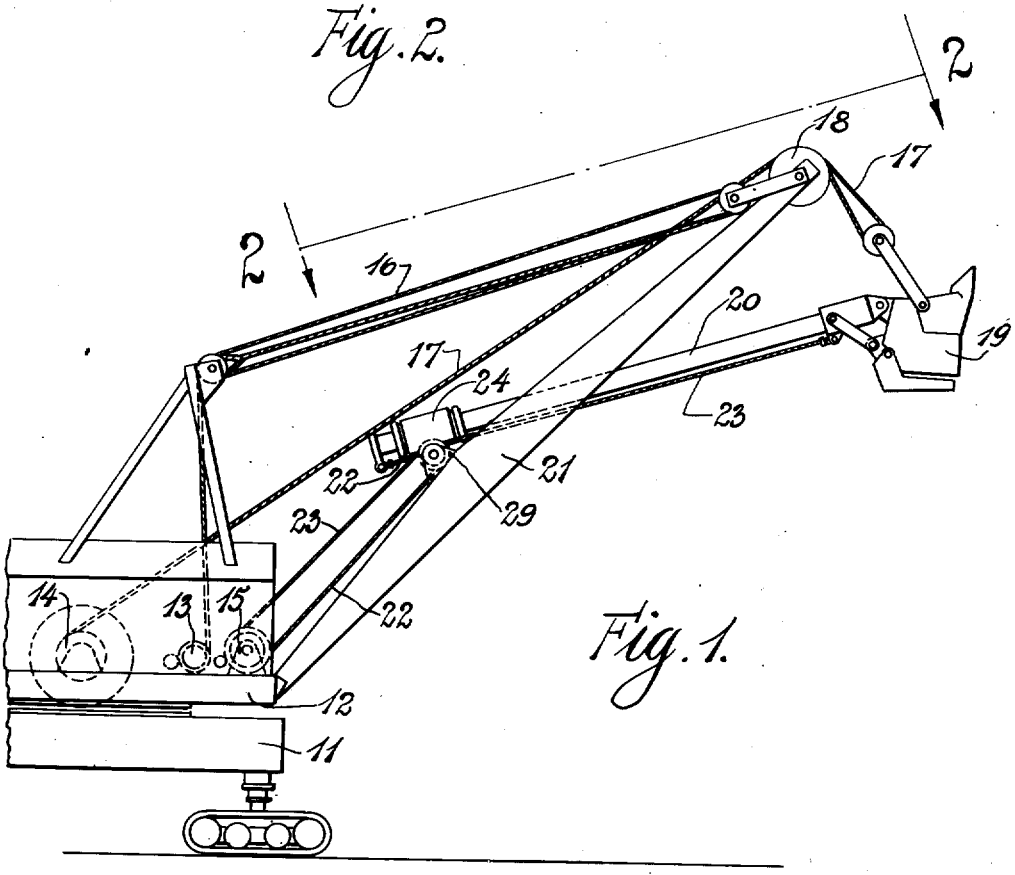
Figure 1 is a side elevation of a power shovel embodying my invention.

Referring to Figure 1, it will be seen that 11 is the propelling base of a power shovel, on which is mounted the revolving frame 12. This latter carries a boom hoist winch 13, a dipper hoist winch 14, and a dipper thrusting winch 15.

Winch 13 manipulates the widely spaced boom suspension cables 16. Winch 14 manipulates twin hoist ropes 17. Each of these ropes passes over one of four boom point sheaves 18, around one of a pair of widely spaced sheaves attached to the dipper 19, and back over one (preferably another) of the sheaves 18 to the winch. This doubles and equalizes each rope.

The dipper 19 is carried on the outer end of a tubular handle 20, which slides in the saddle block, to be hereinafter described, mounted on the boom 21. Winch 15 manipulates thrust rope 22, attached to the rear end of handle 20, and retracting rope 23, attached to the front end of handle 20.

As already stated, the use of this means of thrusting and retracting permits the handle to swivel in the saddle block, without introducing any problems of proper interaction of the thrusting parts on the boom with the thrusted parts on the handle.

Figure 5:
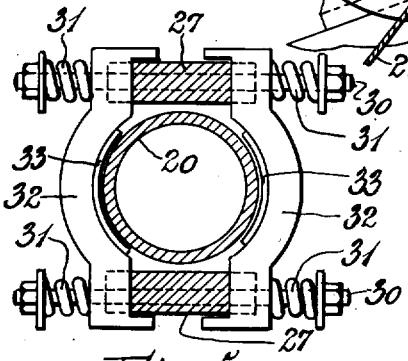
Figure 5 is an end view of these parts, partly in section, taken along the line 5—5 of Figure 4.

Turning now to Figures 3 to 5, we see that the above-mentioned saddle block consists of a hollow member 24, of rectangular cross-section, the bottom of which is appropriately slotted to receive roller 25, which revolves about shipper shaft 26. The top and bottom of member 24 each terminates in two headed yokes 27, making four such yokes in all. The sides of member 24 depend to form bearings 28, to support the member on the shipper shaft 26.

The shipper shaft 26 is in turn supported from boom 21 by brackets 29.

Each pair of yokes 27 supports, by means of bolts 30 and springs 31, two curved pieces 32, each of which carries a bearing plate 33, to bear against the sides of the handle 20.

Ropes 22 and 23 pass over sheaves 34, carried by the shipper shaft 26.

Turning now to Figures 6 and 7, we see how, when a side thrust is imparted to the dipper, and thereby the handle 20 is thrown sidewardly, the resiliency of the saddle block permits this movement, without imparting undue strains to the saddle block assembly, and thence to the boom.

Of course it is to be understood that, from the viewpoint of my broad general combination, other forms of resilient saddle block might be used, and even a non-cylindrical handle, provided that it is permitted in some way to swivel, as by having it reciprocate in a cylindrical guide member within a saddle block similar to that described above.

Any twist on the handle 20, imparted by an uneven pressure on one or the other front corner of the dipper, is, due to the cylindricality of the handle 20, borne solely by the widely spaced twin hoist-ropes 17.

Having now described and illustrated one form of my invention, I wish it to be understood that my invention is not to be limited to the specific form or arrangement of parts hereinbefore described, except in so far as such limitations are specified in the appended claims.

This application is a continuation-in-part, as to all common subject-matter, of my copending application, Serial No. 78,670, filed May 8, 1936, for improvements in power shovels, which application now stands allowed under date of May 21, 1937, and which has now been permitted to lapse without prejudice, in view of its supersession by this present application.

I claim:

1. In a power shovel, the combination of: a base; a boom, inclined forwardly therefrom; a hoist winch supported by the base; a thrust winch supported by the base; a handle, mounted on the boom for reciprocation, and for angular movement in a vertical plane about a fixed point on the boom; a digging dipper carried at the outer end of the handle; means supporting the handle at the above-mentioned point for free turning about the handle axis, while resiliently resisting side-thrust; flexible tension members, actuated by the thrust winch and directly applied to the handle, for reciprocating the handle; twin sheaves, laterally widely spaced at the outer end of the boom; and twin flexible hoist members supporting the dipper at laterally widely spaced points, and thence passing over the twin sheaves to the hoist winch.

2. A power shovel, according to claim 1, characterized by the further fact that the handle is cylindrical.

3. In a power shovel, the combination of: a base; a boom, inclined forwardly therefrom; a hoist winch supported by the base; a handle, mounted on the boom for reciprocation, and for angular movement in a vertical plane about a fixed point on the boom; a digging dipper carried at the outer end of the handle; means supporting the handle at the fixed point for free turning about the handle axis, while resiliently resisting side-thrust; twin sheaves, laterally widely spaced at the outer end of the boom; and twin flexible hoist members supporting the dipper at laterally widely spaced points, and thence passing over the twin sheaves to the hoist winch.

4. A power shovel, according to claim 3, characterized by the further fact that the handle is cylindrical.

5. In a power shovel, the combinaion of: a base; a boom, inclined forwardly therefrom; a hoist winch supported by the base; a thrust winch supported by the base; a handle, mounted on the boom for reciprocation, and for angular movement in a vertical plane about a fixed point on the boom; a digging dipper carried at the outer end of the handle; means supporting the handle at the above-mentioned point for free turning about the handle axis; flexible tension members, actuated by the thrust winch and directly applied to the handle, for reciprocating the handle; twin sheaves, laterally widely spaced at the outer end of the boom; and twin flexible hoist members, supporting the dipper at laterally widely spaced points, and thence passing over the twin sheaves to the hoist winch.

6. A power shovel, according to claim 5, characterized by the further fact that the handle is cylindrical.

7. In a power shovel, the combination of: a base; a boom, inclined forwardly therefrom; a cylindrical handle, mounted on the boom for reciprocation, and for angular movement in a vertical plane about a fixed point on the boom; a digging dipper carried on the outer end of the handle; and a saddle-block assembly, supporting the handle at the above-mentioned point, and made up of the following parts: a shipper shaft, carried by the boom; a handle-supporting roller, journaled on the shipper shaft; a hollow saddle block member, materially larger in cross-section than the cross-section of the handle; a pair of curved handle guides, laterally spaced at each end of the hollow member; and laterally yieldable resilient means whereby the member supports these guides.

8. In a power shovel, the combination of: a base; a boom, inclined forwardly therefrom; a handle, mounted on the boom for reciprocation, and for angular movement in a vertical plane about a fixed point on the boom; a digging dipper carried on the outer end of the handle; and a saddle-block assembly, supporting the handle at the above-mentioned point, and made up of the following parts; a shipper shaft, carried by the boom; a handle-supporting roller, journaled on the shipper shaft; a saddle block member; a pair of handle guides, laterally spaced at each end of the member; and laterally yieldable resilient means, whereby the member supports these guides.

CARL E. STIEHL.